United States Patent [19]

Nagoh et al.

[11] Patent Number: 5,776,376
[45] Date of Patent: Jul. 7, 1998

[54] PHOTOCHROMIC CURABLE COMPOSITION

[75] Inventors: Hironobu Nagoh; Satoshi Imura; Takashi Kobayakawa, all of Tokuyama, Japan

[73] Assignee: Tokuyama Corporation, Yamaguchi, Japan

[21] Appl. No.: 776,029

[22] PCT Filed: May 24, 1996

[86] PCT No.: PCT/JP96/01385

§ 371 Date: Jan. 23, 1997

§ 102(e) Date: Jan. 23, 1997

[87] PCT Pub. No.: WO96/37574

PCT Pub. Date: Nov. 28, 1996

[30] Foreign Application Priority Data

May 25, 1995 [JP] Japan ................. 7-126798

[51] Int. Cl.⁶ .................. G02B 5/23; C08F 2/00
[52] U.S. Cl. ........................ 252/586; 526/204
[58] Field of Search ................... 252/582, 586; 526/204

[56] References Cited

U.S. PATENT DOCUMENTS

| | | |
|---|---|---|
| 4,882,438 | 11/1989 | Tanaka et al. . |
| 4,960,678 | 10/1990 | Tanaka et al. . |
| 5,106,998 | 4/1992 | Tanaka et al. . |
| 5,130,058 | 7/1992 | Tanaka et al. . |
| 5,395,566 | 3/1995 | Kobayakawa et al. . |
| 5,449,731 | 9/1995 | Suzuki et al. ............... 526/322 |

FOREIGN PATENT DOCUMENTS

| | | |
|---|---|---|
| 2-28154 | 1/1990 | Japan . |
| 2-55784 | 2/1990 | Japan . |
| 3-11074 | 1/1991 | Japan . |
| 3-133988 | 6/1991 | Japan . |
| 3-261945 | 11/1991 | Japan . |
| 5-306392 | 11/1993 | Japan . |

OTHER PUBLICATIONS

Database WPI, Section Ch, Week 9349, Japanese Abstract, JP 05 295 358 A, Derwent Publications Ltd., London, GB; Class A89, AN 93-392954, Nov. 9, 1993.

Primary Examiner—Philip Tucker
Attorney, Agent, or Firm—Birch, Stewart, Kolasch & Birch, LLP

[57] ABSTRACT

A photochromic curable composition obtained by adding (E) an α-methylstyrene dimer and (F) a photochromic compound to polymerizable monomers comprising (A) a compound having at least one epoxy group in the molecule, such as glycidyl methacrylate or the like, (B) a polypropylene glycol di(meth)acrylate monomer, (C) a polyethylene glycol di(meth)acrylate monomer and (D) a (meth)acrylate monomer and/or a styryl monomer. This composition is superior in moldability when cured and gives a cured product of excellent durability in photochromism.

14 Claims, No Drawings

PHOTOCHROMIC CURABLE COMPOSITION

This application is a 371 of PCT/JP96/01385 filed on May 24, 1996, published as WO96/37574, Nov. 28, 1996.

TECHNICAL FIELD

The present invention relates to a curable composition which can be suitably used for production of a photochromic cured product having excellent durability in photochromism.

BACKGROUND ART

Photochromism is a phenomenon which has come to draw attention in the last several years, and is such a reversible reaction that a certain compound quickly changes its color when irradiated with an ultraviolet-containing light such as sunlight or a light emitted from a mercury lamp and, when the light irradiation is stopped and the compound is placed in a dark room, returns to the original color. Compounds exhibiting photochromism are called photochromic compounds, and photochromic compounds having various structures have heretofore been synthesized. These conventional photochromic compounds, however, have a problem in that they are poor durability in photochromism.

There are known novel photochromic compounds having improved durability, such as fulgide-based photochromic compounds (hereinafter referred to simply as fulgide compound), chromene-based photochromic compounds (hereinafter referred to simply as chromene compound) and the like. [See U.S. Pat. Nos. 4,882,438, 4,960,678, 5,130,058 and 5,106,998; and Japanese Kokai (Laid-Open) Patent Application Nos. 2-28154, 3-11074 and 3-133988].

Also in Japanese Kokai (Laid-Open) Patent Application No. 5-306392 is proposed combination use of a compound having an epoxy group(s) as a component for further improving the durability of fulgide compound.

These photochromic compounds and the cured product obtained by polymerizing and curing a photochromic curable composition containing said photochromic compound, generally show excellent durability in photochromism. In order to use a photochromic cured product obtained by polymerizing a photochromic curable composition containing such a photochromic compound and a polymerizable monomer(s), for various applications, the photochromic curable composition must have good durability in photochromism and excellent moldability and is capable of affording a cured product superior in various properties.

In the above-mentioned Japanese Kokai (Laid-Open) Patent Application No. 5-306392 is proposed a photochromic curable composition containing a compound having an epoxy group, the above-mentioned photochromic compound and, as a polymerizable monomer, a polyethylene glycol di(meth)acrylate. This composition, when polymerized and cured, gives a photochromic cured product having excellent durability in photochromism, but has the following problems. That is, the photochromic cured product has a high water absorption and, when stored over a long period of time, causes quality change with time owing to water absorption and in consequence, its photochromism at the initial stage is unstable. Moreover, since the composition has a high shrinkage after polymerization, releasing from a mold is liable to occur when such composition is cured in the mold, resulting in that it gives a defective cured product having a surface of poor appearance and a reduced yield in polymerization.

DISCLOSURE OF THE INVENTION

The present inventors have continued extensive studies on a curable composition which is prepared by polymerizing a mixture of the above-mentioned photochromic compound and a polymerizable monomer(s) to produce a photochromic cured product typified by a photochromic lens. As a result, the present inventors have found that a photochromic curable composition having the following specific composition is superior not only in durability in photochromism but also in moldability and that a cured product from the composition has excellent physical properties. The present invention has been accomplished based on the above finding.

The present invention resides in a photochromic curable composition comprising a polymerizable monomer composed of 0.1 to 30 parts by weight of (A) a compound having at least one epoxy group in the molecule, 30 to 70 parts by weight of (B) a polypropylene glycol di(meth)acrylate monomer represented by the following general formula (I):

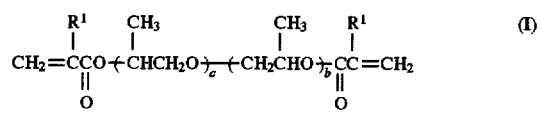

(wherein $R^1$ is a hydrogen atom or a methyl group, and a and b are each independently a number of 0 to 7 with a proviso that (a+b)=2 to 7), 20 to 60 parts by weight of (C) apolyethylene glycol di(meth)acrylate monomer represented by the following general formula (II):

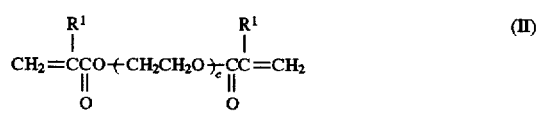

(wherein $R^1$ is a hydrogen atom or a methyl group, and c is an integer of 2 to 9), and 0 to 35 parts by weight of (D) a (meth)acrylate monomer and/or a styryl monomer, the total of the components (A), (B), (C) and (D) being 100 parts by weight, and 0.1 to 2 parts by weight, based on 100 parts by weight of the polymerizable monomer, of (E) an α-methylstyrene dimer, and 0.001 to 10 parts by weight, based on 100 parts by weight of the polymerizable monomer, of (F) a photochromic compound.

By containing a compound having at least one epoxy group in the molecule as the component (A) (hereinafter referred to as an epoxy compound) in the composition of the present invention, the photochromic compound as the component (F), particularly the fulgide compound, can have improved durability in photochromism in a cured product obtained from the composition of the invention.

The epoxy compound used as the component (A) in the present composition can be any known compound without limitation. It includes, for example, reaction products between epichlorohydrin and alcoholic hydroxyl group containing compound such as mono-, di- or tri-valent alcohol or phenolic hydroxyl group-containing compound such as phenol or hydroquinone, and reaction products between epichlorohydrin and carboxylic acid such as benzoic acid or terephthalic acid. Typical epoxy compounds can be represented by the following general formula (III).

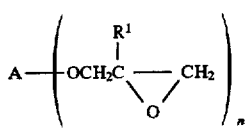

(wherein A is a residue of an n-valent alcoholic hydroxyl group-containing compound, a residue of an n-valent phenolic hydroxyl group-containing compound, or a residue of an n-valent carboxylic acid; $R^1$ is a hydrogen atom or a methyl group; and n is an integer of 1 to 4).

The epoxy compound of the present invention preferably has further at least one unsaturated double bond group in the molecule. When such an epoxy compound having an unsaturated double bond group and an epoxy group is used to produce a photochromic cured product, the epoxy compound is polymerized with a polymerizable monomer to form a polymer matrix to fix the epoxy compound three-dimensionally and therefore, even though the epoxy compound is used in a large amount, it does not impair the properties of the photochromic cured product obtained.

The unsaturated double bond group includes, for example, a vinyl group, an allyl group, an acryloyl group and a methacryloyl group. An acryloyl group or a methacryloyl group is preferred to obtain a cured product of good photochromic property.

As the epoxy compound having no unsaturated double bond group, there are mentioned compounds of the above general formula (III) wherein n is 1 or 2 and A is, when n is 1, an alkyl group having 2 to 20 carbon atoms which may be substituted with a hydroxyl group(s), a group represented by —R—(OR)$_m$—OH (in which R is an alkylene group having 2 to 4 carbon atoms, and m is an integer of 1 to 20), a cycloalkyl group having 6 to 7 carbon atoms which may be substituted with a hydroxyl group(s), a phenyl group which may be substituted with a hydroxyl group(s), or a benzoyl group which may be substituted with a carboxyl group(s); and when n is 2, an alkylene group having 2 to 20 carbon atoms which may be substituted with a hydroxyl group(s), a group represented by —R—(OR)$_m$— (in which R is an alkylene group having 2 to 4 carbon atoms, and m is an integer of 1 to 20), a cycloalkylene group having 6 to 7 carbon atoms which may be substituted with a hydroxyl group(s), a phenylene group which may be substituted with a hydroxyl group(s), a phthaloyl, isophthaloyl or terephthaloyl group which may be substituted with a hydroxyl group (s), or a group represented by the following formula:

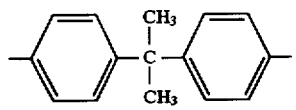

As the epoxy compound having at least one unsaturated double bond group, there can be mentioned compounds represented by the following general formula (IV) which are typical compounds preferably used in the present invention:

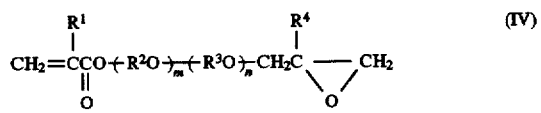

(wherein $R^1$ and $R^4$ are each a hydrogen atom or a methyl group; R2 and $R^3$ may be the same or different and are each an alkylene group having 1 to 4 carbon atoms which may be substituted with a hydroxyl group(s), or a group represented by the following formula

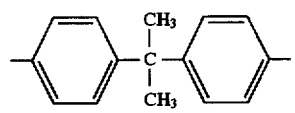

and m and n are each 0 or 1).

In the above formula, the alkylene group represented by $R^2$ can be exemplified by methylene group, ethylene group, propylene group, butylene group, trimethylene group and tetramethylene group.

Specific examples of the epoxy compound preferably usable in the present invention are as follows.

Examples of the compound having, in the molecule, at least one epoxy group but no unsaturated double bond group are ethylene glycol glycidyl ether, propylene glycol glycidyl ether, glycerol polyglycidyl ether, diglycerol polyglycidyl ether, sorbitol polyglycidyl ether, butyl glycidyl ether, phenyl glycidyl ether, polyethylene glycol diglycidyl ether, polypropylene glycol diglycidyl ether, neopentyl glycol diglycidyl ether, 1,6-hexanediol diglycidyl ether, addition product of bisphenol A or hydrogenated bisphenol A with propylene oxide, diglycidyl terephthalate, spiroglycol diglycidyl ether and hydroquinone diglycidyl ether.

Examples of the compound having, in the molecule, at least one epoxy group and at least one unsaturated double bond group are acrylate or methacrylate compounds such as glycidyl acrylate, glycidyl methacrylate, β-methylglycidyl acrylate, β-methylglycidyl methacrylate, bisphenol A-monoglycidyl ether methacrylate, 4-glycidyloxybutyl methacrylate, 3-(glycidyl-2-oxyethoxy)-2-hydroxypropyl methacrylate, 3-(glycidyloxy-1-isopropyloxy)-2-hydroxypropyl acrylate, 3-(glycidyloxy-2-hydroxypropyloxy)-2-hydroxypropyl acrylate and the like.

In the present composition, the proportion of the epoxy compound used can be appropriately determined depending upon the application of the photochromic cured product, and can be selected from a wide range because the epoxy compound can exhibit its effect by use in a small amount. Generally, the effect of the present invention can be achieved by use of the epoxy compound in an amount of generally 0.1 to 30 parts by weight, preferably 0.1 to 10 parts by weight, per 100 parts by weight of the whole polymerizable monomer. When an epoxy compound having no unsaturated double bond group is used, it is used in an amount of preferably 0.1 to 10 parts by weight, more preferably 0.1 to 5 parts by weight, per 100 parts by weight of the whole polymerizable monomer because use of too large an amount of such an epoxy compound prevents the curing of the cured product.

Incidentally, the above-mentioned polymerizable monomer refers to a compound having an epoxy group(s) and/or an unsaturated double bond(s), capable of causing radical polymerization, and the whole polymerizable monomer refers to the total amount of the components (A), (B), (C) and (D) in the curable composition of the present invention. Therefore, the α-methylstyrene dimer as the component (E), which functions as a polymerization modulater, is not included in the polymerizable monomer. The same applies also hereinafter. By containing a polypropylene glycol di(meth)acrylate monomer [the component (B)] represented by the general formula (I) in the composition of the present invention, the photochromic cured product obtained by polymerization of the composition has a reduced water absorption and a reduced shrinkage after polymerization. This meritorious effect is presumed to be brought about by the side chain methyl groups in the general formula (I). A compound of the general formula (I) having methyl groups as the side chains is used because compounds having side chain groups having more carbon atoms than that of methyl group are difficult to procure commercially and are expensive. When the proportion of the component (B) used in the present composition is too large, the photochromic compound as the component (F), particularly the fulgimide compound, shows reduced durability in photochromism in the cured product obtained from the composition, while when the proportion of the component (B) is too small, the above-mentioned meritorious effect is difficult to obtain. Therefore, the amount of the component (B) is preferably 30 to 70 parts by weight, more preferably 40 to 65 parts by weight, per 100 parts by weight of the whole polymerizable monomer. In the general formula (I), (a+b) refers to the length of the oxypropylene chain. When the number of (a+b) is too large, the photochromic cured product formed of the resulting composition has no sufficient heat resistance and hence, when heated, causes dimensional deformation, which is not preferable. When the number of (a+b) is too small, the cured product has no sufficient impact resistance. Accordingly, there is preferred a compound with (a+b) number being 2 to 7, preferably 3 or 4. The component (B) used in the present composition can be a single compound with (a+b) number being a single number, but may also be a mixture of a plurality of compounds each having a different (a+b) number between 2 and 7. Incidentally, in the present invention, "(meth) acrylate monomer" refers to a generic name for methacrylate compound and acrylate compound.

By containing a polyethylene glycol di(meth)acrylate monomer [the component (C)] represented by the general formula (II) in the composition of the present invention, the durability in photochromism of the photochromic compound as the component (F) is not impaired even when the polypropylene glycol di(meth)acrylate monomer [the component (B)] is blended. When the proportion of the component (C) used in the present composition is too small, the durability in photochromism of the photochromic compound is declined, while when the proportion is too large, the cured product obtained by polymerization of the resulting composition has too high a water absorption and too high a shrinkage after polymerization. Therefore, the proportion of the component (C) is preferably 20 to 60 parts by weight, more preferably 25 to 50 parts by weight, most preferably 40 to 50 parts by weight, per 100 parts by weight of the whole polymerizable monomer. In the general formula (II), c refers to the length of oxyethylene chain. When the number of c is too large, the photochromic cured product obtained from the resulting composition has no sufficient heat resistance and hence, when heated, causes dimensional deformation, which is not preferable. When the number of c is too small, the cured product has no sufficient impact resistance. Therefore, there is preferred a compound with the number of c is 2 to 7, preferably 3 or 4. The component (C) used in the present composition can be a single compound with the number of c being a single number, but may also be a mixture of a plurality of compounds each having a different c number between 2 and 9.

In the present composition, in addition to the components (A), (B) and (C), a (meth)acrylate monomer and/or a styryl monomer can be used as the component (D), depending upon the intended purpose of the composition. Preferred examples of these monomers include monofunctional (meth) acrylate monomers such as methyl (meth) acrylate, ethyl (meth)acrylate, butyl (meth)acrylate, isobornyl (meth) aacrylate, benzyl (meth)acrylate, phenyl (meth)acrylate, tri- bromophenyl (meth)acrylate, 2-hydroxyethyl (meth) acrylate, phenoxyethyl (meth)acrylate, phenoxypolyethylene glycol (meth)acrylate, alkoxypolyethylene glycol (meth)acrylate, alkoxypolypropylene glycol (meth)acrylate, trifluoromethyl (meth)acrylate and the like; polyfunctional (meth)acrylate monomers such as polybutylene glycol di(meth)acrylate, 1,6-hexanediol di(meth) acrylate, neopentyl glycol di(meth)acrylate, acrylate or methacrylate compound of 2,2'-bis(4-methacryloyloxyethoxyphenyl)propane, acrylate or methacrylate compound of 2,2'-bis(4-methacryloyloxypolyethoxyphenyl) propane, acrylate or methacrylate of 2,2'-bis(4-methacryloyloxypropoxyphenyl) propane, acrylate or methacrylate compound of 2,2'-bis(4-methacryloyloxypolypropoxyphenyl) propane, acrylate or methacrylate compound of 2,2'-bis(3,5-dibromo-4-methacryloyloxyethoxy) propane, acrylate ormethacrylate compound of addition product of hydrogenated bisphenol A with ethylene oxide or propylene oxide, dimethyloltricyclodecane di(meth)acrylate, dimethyloltricyclodecane polyethoxydi(meth)acrylate, trimethylolpropane tri(meth) acrylate, pentaerythritol tetra(meth)acrylate, reaction product of ethylene glycol or polyethylene glycol with glycidyl (meth)acrylate, reaction product of propylene glycol or polypropylene glycol with glycidyl(meth)acrylate, reaction product of glycidyl (meth)acrylate with addition product of bisphenol A with ethylene oxide or propylene oxide, reaction product of glycidyl (meth)acrylate with addition product of hydrogenated bisphenol A with ethylene oxide or propylene oxide, and urethane acrylate; and styryl monomers such as styrene, chlorostyrene, α-methylstyrene, vinylnaphthalene, isopropenylnaphthalene, bromostyrene, divinylbenzene and the like.

These (meth)acrylate monomers and/or styryl monomers can be used singly or in admixture of two or more. The proportion thereof can be determined depending upon the application of the cured product obtained from the present composition. However, the preferable proportion is generally 0 to 35 parts by weight, preferably 0 to 25 parts by weight, more preferably 0 to 15 parts by weight, per 100 parts by weight of the whole polymerizable monomer because too large an amount impairs the effect intended by the present invention.

The α-methylstyrene dimer used as the component (E) in the present composition is used as a polymerization modulater in curing the composition of the invention. The chain transfer action of the α-methylstyrene dimer inhibits abrupt and violent polymerization and curing and enables moderate polymerization and curing, and consequently, the cured product rarely has polymerization strain and a higher yield in polymerization is obtained. The proportion of the component (E) used is preferably 0.1 to 2 parts by weight, more preferably 0.5 to 1 part by weight, per 100 parts by weight of the whole polymerizable monomer because, when the proportion is too large, the photochromic compound [the component (F)] shows reduced durability in photochromism in the cured product obtained from the resulting composition.

As the photochromic compound as the component (F) used in the present composition, any compound showing photochromism may be used without restriction. For example, photochromic compounds such as fulgide compounds, chromene compounds, spirooxazine compounds and the like are well known, and these photochromic compounds can be used in the present invention. As the fulgide compounds and chromene compounds, there can be preferably used those compounds disclosed in, for example, U.S. Pat. Nos. 4,882,438, 4,960,678, 5,130,058 and 5,106,998.

In the present composition, a fulgide compound can be used preferably because fulgide compounds, as compared with other photochromic compounds, are particularly high in photochromism durability improvement intended by the present invention. The fulgide compounds suitably used in the present invention can be represented by the following general formula (V):

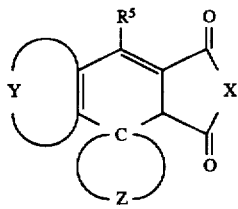

[wherein the group represented by the following formula

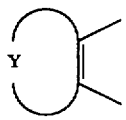

is a substituted or unsubstituted bivalent aromatic hydrocarbon group or a substituted or unsubstituted bivalent unsaturated heterocyclic group; $R^5$ is an alkyl group, an aryl group, or a monovalent heterocyclic group; the group represented by the following formula:

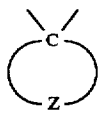

is a norbornylidene group or an adamantylidene group; and X is an oxygen atom, a group represented by $>N-R^6$, a group represented by $>N-A_1-(A_2)_m-(B_2)_n-R^7$, a group represented by $>N-A_3-A_4$ or a group represented by $>N-A_3-R^8$ (in which $R^6$ is a hydrogen atom, an alkyl group or an aryl group; $A_1$, $A_2$ and $A_3$ may be the same or different and are each an alkylene group, an alkylidene group, a cycloalkylene group or an alkylcycloalkan-diyl group; $B_1$ and $B_2$ may be the same or different and are each a group represented by the following group:

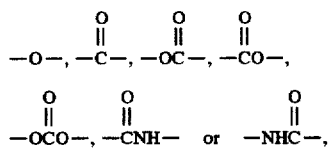

and m and n are each independently 0 or 1 with a proviso that when m is 0, n is 0; $R^7$ is an alkyl group, a naphthyl group or a naphthylalkyl group; $A_4$ is a naphthyl group; and $R^8$ is a halogen atom, a cyano group or a nitro group)].

In the general formula (V), the bivalent aromatic hydrocarbon group represented by the following formula:

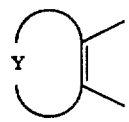

includes, for example, bivalent groups derived from a benzene ring or from a fused ring of 2 or 3 benzene rings. The bivalent unsaturated heterocyclic ring includes, for example, bivalent groups derived from a 5- to 7-membered ring containing 1 to 2 oxygen, nitrogen or sulfur atoms as the ring-forming atom(s), or from a fused ring of the above 5- to 7-membered ring and a benzene ring. Specific examples of the bivalent aromatic hydrocarbon group are groups of 6 to 14 carbon atoms derived from benzene ring, naphthalene ring, phenanthrene ring, anthracene ring or the like. Specific examples of the bivalent unsaturated heterocyclic group are groups of 4 to 9 carbon atoms derived from furan ring, benzofuran ring, pyridine ring, quinoline ring, isoquinoline ring, pyrrole ring, thiophene ring, thiophene ring, benzothiophene ring or the like.

The substituents for the above are not particularly restricted and can be exemplified by halogen atoms such as chlorine, bromine, iodine and the like; alkyl groups of 1 to 4 carbon atoms such as methyl group, ethyl group and the like; alkoxy groups of 1 to 4 carbon atoms such as methoxy group, ethoxy group and the like; aryl groups of 6 to 10 carbon atoms such as phenyl group, tolyl group, xylyl group and the like; alkoxyaryl groups of 7 to 14 carbon atoms (aryl groups of 6 to 10 carbon atoms each substituted with an alkoxy group having 1 to 4 carbon atoms); amino group; nitro group; and cyano group.

In the general formula (V), the alkyl group, aryl group and heterocyclic group represented by $R^5$ include the above-mentioned alkyl groups of 1 to 4 carbon atoms, the above-mentioned aryl groups of 6 to 10 carbon atoms, and monovalent groups each derived from a 5- to 7-membered ring containing 1–2 oxygen, nitrogen or sulfur atoms as the ring-forming atom(s), or from a fused ring of the above 5-to 7-membered ring and a benzene ring.

In the general formula (V), the alkyl group and aryl group represented by $R^6$ are the same groups as mentioned with respect to $R^5$. The alkylene group represented by $A_1$, $A_2$ and $A_3$ is preferably a group having 1 to 4 carbon atoms such as methylene group, ethylene group, propylene group, trimethylene group, tetramethylene group or the like; the alkylidene group is preferably a group having 2 to 4 carbon atoms such as ethylidene group, propylidene group, isopropylidene group or the like; the cycloalkylene group is preferably, for example, a cyclohexylene group; and the alkylcycloalkan-diyl group is preferably, for example, a dimethylcyclohexan-diyl group.

In the general formula (V), the alkyl group represented by $R^7$ is the same group as mentioned with respect to $R^5$; and the naphthylalkyl group is preferably a group having 11 to 14 carbon atoms such as naphthylmethyl group, naphthylethyl group or the like.

Of the fulgide compounds represented by the general formula (V), there is preferred, in view of the durability in photochromism, etc., a compound of general formula (V) in which $R^5$ is an alkyl group; X is $>N-R$ [R is a cyanoalkyl group having 1 to 4 carbon atoms, a nitroalkyl group having 1 to 4 carbon atoms or an alkoxycarbonylalkyl group having 3 to 9 carbon atoms (containing an alkoxy group having 1 to 4 carbon atoms and an alkylene group having 1 to 4 carbon atoms); the group represented by the following formula:

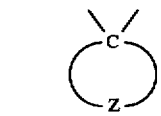

is an adamantylidene group; and the group represented by the following formula:

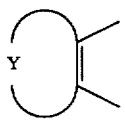

is a heterocyclic group which may be substituted with an aryl group having 6 to 10 carbon atoms or an alkoxyaryl group having 7 to 14 carbon atoms (an aryl group having 6 to 10 carbon atoms substituted with an alkoxy group having 1 to 4 carbon atoms), particularly a group derived from a thiophene ring.

When a photochromic compound is used for a spectacle lens, color such as gray, brown or the like is preferably chosen. Such a color is not achieved with a single photochromic compound, and two or more photochromic compounds are used in combination. The fulgide compounds generally develop an orange to blue color, and accordingly, by blending a chromene compound which develops a yellow to orange color, a neutral color such as gray, brown or the like can be obtained. Since the fulgide compounds, however, are inferior in durability in photochromism as compared with chromene compounds, there have been a problem that the fulgide compound change the colors with the lapse of time and as a result, the color of a fulgide compound-chromene compound mixture changes with time as well. According to the present invention, however, the change of color with time can be lessened by improving the photochromism durability of fulgide compound and bringing it close to that of chromene compound.

The chromene compound suitably used in combination with the fulgide compound to obtain a neutral color, can be represented by the following general formula (VI):

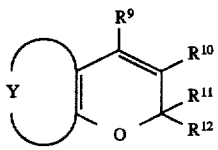
(VI)

(wherein $R^9$, $R^{10}$, $R^{11}$ and $R^{12}$ may be the same or different and are each a hydrogen atom, an alkyl group, an aryl group, a substituted amino group or a saturated heterocyclic group and $R^{11}$ and $R^{12}$ may form a ring together; and the group represented by the following formula:

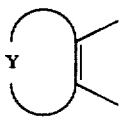

is a bivalent aromatic hydrocarbon group or a bivalent unsaturated heterocyclic group).

In the general formula (VI), the alkyl group and aryl group represented by $R^9$, $R^{10}$, $R^{11}$ and $R^{12}$ can be the same alkyl groups and aryl groups as mentioned with respect to the general formula (V); the substituted amino group includes amino groups in which at least one of the hydrogen atoms is substituted with the above-mentioned alkyl group (s) or aryl group(s); the saturated heterocyclic group includes monovalent groups each derived from a 5- to 6-membered ring containing, as a ring-forming atom(s), 1 or 2 nitrogen, oxygen or sulfur atoms, such as pyrrolidine ring, imidazolidine ring, piperidine ring, piperazine ring, morpholine ring or the like.

In the general formula (VI), the ring which $R^{11}$ and $R^{12}$ form together includes a norbornylidene group, a bicyclo [3.3.1]9-nonylidene group, etc.

In the formula (VI), the bivalent aromatic hydrocarbon group or bivalent unsaturated heterocyclic group represented by the following formula:

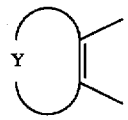

are the same groups as mentioned with respect to the general formula (V). The substituents of these groups are not particularly restricted and can be exemplified by halogen atoms such as chlorine, bromine, iodine and the like; alkyl groups of 1 to 20 carbon atoms such as methyl group, ethyl group and the like; alkoxy groups of 1 to 20 carbon atoms such as methoxy group, ethoxy group and the like; aryl groups of 6 to 10 carbon atoms such as phenyl group, tolyl group, xylyl group and the like; amino group; nitro group; and cyano group.

Particularly suitable as the chromene compound is a compound of general formula (VI) in which $R^9$ and $R^{10}$ are each a hydrogen atom; $R^{11}$ and $R^{12}$ may be the same or different and are each an alkyl group having 1 to 4 carbon atoms, or may together form a bicyclo[3.3.1]9-nonylidene group or a norbornylidene group; and the group represented by the following formula

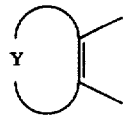

is a group derived from a naphthalene ring which may be substituted with an alkyl group(s) of 1 to 20 carbon atoms or an alkoxy group(s) of 1 to 20 carbon atoms.

Specific examples of the fulgide compound and chromene compound, which can be suitably used in the present invention, are as follows. Fulgide compounds:

(1) N-cyanomethyl-6,7-dihydro-4-methyl-2-phenylspiro (5,6-benzo [b]thiophenedicarboxyimido-7,2-tricyclo [3.3.1.1]decane)

(2) N-cyanomethyl-6,7-dihydro-2-(p-methoxyphenyl)-4-methylspiro(5,6-benzo[b]thiophenedicarboxyimido-7,2-tricyclo [3.3.1.1]decane)

(3) N-cyanomethyl-6,7-dihydro-4-methylspiro(5,6-benzo [b]thiophenedicarboxyimido-7,2-tricyclo-[3.3.1.1]decane)

(4) 6,7-dihydro-N-methoxycarbonylmethyl-4-methyl-2-phenylspiro (5,6-benzo[b]thiophenedicarboxyimido-7,2-tricyclo [3.3.1.1]decane)

(5) 6,7-dihydro-4-methyl-2-(p-methylphenyl)-N-nitromethylspiro (5,6-benzo[b]thiophenedicarboxyimido-7, 2-tricyclo [3.3.1.1]decane)

(6) N-cyanomethyl-6,7-dihydro-4-cyclopropyl-3-methylspiro (5,6-benzo[b]thiophenedicarboxyimido-7,2-tricyclo [3.3.1.1]decane)

(7) N-cyanomethyl-6,7-dihydro-4-cyclopropyl-spiro(5,6-benzo [b]thiophenedicarboxyimido-7,2-tricyclo[3.3.1.1] decane)

Chromene compounds:

(1) spiro[norbornane-2,2'-[2H]benzo[h]chromene]

(2) spiro bicyclo[3.3.1]nonane 9.2.2H benzo[H] [chromene]

(3) 7'-methoxyspiro[bicyclo[3.3.1]nonane-9, 2'-[2H] benzo[h]chromene (4) 7-methoxyspiro[norbornane-2-3-[3H]benzo[f] chromene]

(5) 2,2-dimethyl-7-octoxy[2H]benzo[h]chromene.

Besides the fulgide compound and the chromene compound, there may be used a spirooxazine compound (hereinafter abbreviated to an oxazine compound). The oxazine compound may be any known compound having a spirooxazine skeleton and showing a photochromic property. A spirooxazine compound represented by the following general formula (VII) can be used suitably.

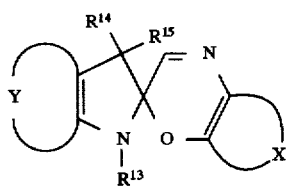

(VII)

In the above general formula (VII), $R^{13}$, $R^{14}$ and $R^{15}$ may be the same or different and are each an alkyl group, a cycloalkyl group, a cycloaralkyl group, an alkoxy group, an alkyleneoxyalkyl group, an alkoxycarbonyl group, an alkoxycarbonylalkyl group, an aryl group, an aralkyl group, an aryloxy group, an alkylenethioalkyl group, an acyl group, an acyloxy group or an amino group. $R^{14}$ and $R^{15}$ may together form a ring, and $R^{13}$, $R^{14}$ and $R^{15}$ may each have a substituent(s). The substituent(s) includes (include), besides the above-mentioned groups, halogen atom, nitro group, cyano group, heterocyclic group, etc. The group represented by

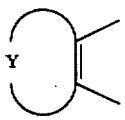

is a substituted or unsubstituted bivalent aromatic hydrocarbon group or a substituted or unsubstituted bivalent unsaturated heterocyclic group. The group represented by

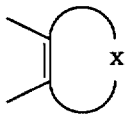

is a substituted or unsubstituted bivalent aromatic hydrocarbon group or a substituted or unsubstituted bivalent unsaturated heterocyclic group. Specific examples of these groups are the same groups as those mentioned above with respect to the general formula (V). The substituents can be the same groups as mentioned above with respect to $R^{13}$, $R^{14}$ and $R^{15}$. In particular, a group represented by

—NR$^{16}$R$^{17}$ (wherein $R^{16}$ and $R^{17}$ are each an alkyl group, an alkoxy group, an allyl group or the like, each of which may be substituted; and $R^{16}$ and $R^{17}$ may be bonded and cyclized with each other to form a nitrogen-containing heterocyclic ring) is preferable from the standpoint of high density of its developed color in the initial photochromic performance.

Specific examples of the oxazine compound, preferably usable in the present invention are as follows.

(1) 1'-Methoxycarbonylmethyl-8"-methoxy-6"-(4-methylpiperazino) dispiro(cyclohexane-1,3'-(3H)indole-2'-(2-H), 3-(3H)naphtho 3,2a)(1,4)oxazine)

(2) 6'-Fluoro-1',5'-dimethyl-6"-morpholinodispiro (cyclohexane-1,3(3H)indole-2'(2H),3"(3H)naphtho 3,2a) (1,4)oxazine)

(3) 6'-Fluoro-5'-methyl-1'-isobutyl-6"-morpholinodispirocyclohexane-1,3(3H)indole-2-(2H),3" (3H)naphtho(3,2a)(1,4)oxazine)

In the present invention, even when the amount of the photochromic compound [the component (F)] is small, the durability in photochromism of the photochromic compound is not impaired owing to the contribution of the epoxy compound [the component (A)] and the polyethylene glycol di (meth) acrylate monomer [the component (C)]. However, when the amount of the photochromic compound is too large, the compound causes condensation, resulting in large reduction in the durability. Therefore, the photochromic compound is used in an amount of preferably 0.001 to 10 parts by weight, more preferably 0.01 to 5 parts by weight, particularly preferably 0.01 to 1 part by weight, per 100 parts by weight of the whole polymerizable monomer. In this range, the best photochromic performance is obtained.

In the photochromic curable composition of the present invention, there can be further contained, if required, various stabilizers and additives such as a mold-releasing agent, ultraviolet absorber, infrared absorber, ultraviolet stabilizer, antioxidant, coloring inhibitor, antistatic agent, fluorescent dye, dye, pigment, odorant and the like.

In the photochromic composition of the present invention, addition of an ultraviolet stabilizer is preferred because the durability of the photochromic compound used in the composition can be further improved thereby. Since a fulgide compound shows particularly large improvement in the durability when an ultraviolet stabilizer is added thereto, use of an ultraviolet stabilizer in the present composition containing a combination of a fulgide compound and a chromene compound as described above can favorably prevent the change with time, of the neutral color developed by these compounds.

As the ultraviolet stabilizer, there can be preferably used a hindered amine light stabilizer, a hindered phenol light stabilizer, a sulfur-based antioxidant.

The amount of the ultraviolet stabilizer used is not particularly restricted, but a preferable amount is generally 0.001 to 10 parts by weight, preferably 0.01 to 1 part by weight, per 100 parts by weight of the whole polymerizable monomer.

When the fulgide compound and the chromene compound are used in combination, the change with time of the mixed color developed by these two photochromic compounds can be suppressed by addition of a phosphorous acid ester. Therefore, combination use of an ultraviolet stabilizer and a phosphorous acid ester in a system using both the fulgide compound and the chromene compound is most preferable in the present invention. The amount of the phosphorous acid ester used is preferably 0.001 to 10 parts by weight, more preferably 0.01 to 1 part by weight, per 100 parts by weight of the whole polymerizable monomer.

When an infrared absorber is used in the present composition, there can be obtained a photochromic cured product having not only photochromism but also infrared absorptivity. There can be used, as the infrared absorber, a polymethine compound, a diimmonium compound, a cyanine compound, an anthraquinone compound and an aluminum compound. A diimmonium compound is preferred because it has a large molecular absorptivity coefficient and can show an effect in a small amount.

The amount of the infrared absorber used is preferably 0.0001 to 1 part by weight, more preferably 0.001 to 0.01 part by weight, per 100 parts by weight of the whole polymerizable monomer.

The polymerization process for obtaining a cured product from the photochromic curable composition of the present invention is not particularly restricted, and a known radical polymerization process can be used. The polymerization can be initiated by the use of a radical polymerization initiator such as peroxide, azo compound or the like, or by the application of ultraviolet light, α-ray, β-ray, γ-ray or the like, or by the combination use of the above two means. In a typical polymerization process, cast polymerization can be employed; that is, the photochromic curable composition of the present invention containing a radical polymerization initiator is poured into a mold held by an elastomer gasket or spacer, the mold is placed in an air furnace to give rise to polymerization of the composition, and then the resulting material is taken out.

The radical polymerization initiator is not particulary restricted and can be a known radical polymerization initiator. Typical examples thereof are diacyl peroxides such as benzoyl peroxide, p-chlorobenzoyl peroxide, decanoyl peroxide, lauroyl peroxide, acetyl peroxide and the like; peroxy esters such as t-butyl peroxy-2-ethylhexanoate, t-butyl peroxyneodecanoate, cumyl peroxyneodecanoate, t-butyl peroxybenzoate and the like; percarbonates such as diisopropyl peroxydicarbonate, di-sec-butyl peroxydicarbonate and the like; and azo compounds such as azobisisobutyronitrile and the like.

The amount of the radical polymerization initiator used varies depending upon the polymerization conditions employed, the kinds of initiator used and the composition of monomers used, and cannot be specified generally. However, the suitable amount is generally 0.001 to 10 parts by weight, preferably 0.01 to 5 parts by weight, per 100 parts by weight of the whole polymerizable monomer.

Of the polymerization conditions, the polymerization temperature, in particular, exerts an influence on the properties of the photochromic cured product obtained. The temperature condition varies depending upon the kind and amount of initiator used and the kinds of monomers used, and cannot be specified generally. However, it is generally preferred to conduct so-called tapered type two-step polymerization wherein polymerization is initiated at a relatively low temperature, the temperature is increased gradually and, upon the completion of polymerization, curing is conducted at a high temperature. The polymerization time also varies depending upon various factors similarly to the polymerization temperature. Therefore, it is preferred to determine, in advance, an optimum polymerization time to meet the conditions, while it is preferable that the conditions are selected so as to complete the polymerization generally in 2 to 40 hours.

The photochromic cured product obtained as above can be subjected to the following treatments, depending upon the application. That is, to the cured product can be applied processings and secondary treatments such as dyeing by the use of a dye such as disperse dye or the like; treatment by a silane coupling agent or a hard-coat agent containing, as the main component, a sol of silicon, zirconium, antimony, aluminum, tin, tungsten or the like; an anti-reflection treatment by formation of a thin film of a metal oxide (e.g. $SiO_2$, $TiO_2$ or $ZrO_2$) by vapor deposition, or an antistatic treatment by coating of a thin film of an organic polymer;; and so forth.

The cured product obtained by polymerizing the photochromic curable composition of the present invention is superior not only in durability in photochromism but also in moldability and, when stored over a long period of time, can retain its initial photochromism. Further, it is possible to obtain the photochromic cured product superior in transparency, surface hardness, solvent resistance, heat resistance, impact resistance, coatability and dyeability.

Therefore, the cured product obtained by polymerizing the photochromic curable composition of the present invention is useful as an organic glass having photochromism and can be suitably used in applications such as photochromic lens and the like.

EXAMPLES

The present invention is hereinafter described specifically by way of Examples. However, the present invention is not restricted to these Examples.

In the following Examples, the following compounds were used as the components (A) to (F) and the component (G) (ultraviolet stabilizer).

(A) Epoxy compounds

GMA: Glycidyl methacrylate

MGA: β-methylglycidyl acrylate

BPMGMA: Bisphenol A monoglycidyl ether methacrylate

EGGE: Ethylene glycol glycidyl ether (B) Polypropylene glycol di(meth)acrylates

3PG: Tripropylene glycol dimethacrylate

4PG: Tetrapropylene glycol dimethacrylate (a monomer mixture of polypropylene glycol dimethacrylate having four (on an average) moles of oxypropoylene chains (C) Polyethylene glycol di(meth)acrylates 3G: Triethylene glycol dimethacrylate 4G: Tetraethylene glycol dimethacrylate (a monomer mixture of polyethylene glycol dimethacrylates, having four (on an average) moles of oxyethylene chains (D) (Meth)acrylate monomers and styryl monomers MMA: Methyl methacrylate MS: α-Methylstyrene BZMA: Benzyl methacrylate HEMA: 2-Hydroxyethyl methacrylate (E) α-Methylstyrene dimer (F) Photochromic compounds

[Fulgide compounds]

f1: N-Cyanomethyl-6,7-dihydro-4-methyl-2-phenylspiro (5,6- benzo [b]thiophenedicarboxiimido-7,2-tricyclo [3.3.1.1] decane)

f2: N-Cyanomethyl-6,7-dihydro-2-(p-methoxyphenyl)-4-methylspiro (5,6-benzo[b]thiophenedicarboxiimido-7,2-tricyclo [3.3.1.1]decane)

f3: N-Cyanomethyl-6,7-dihydro-4-methylspiro(5,6-benzo [b]thiophenedicarboxiimido-7,2-tricyclo-[3.3.1.1] decane)

[Chromene compounds]

c1: Spiro(norbornane-2,2'-[2H]benzo[h]chromene)

c2: Spiro(bicyclo[3.3.1]nonane-9,2'-[2H]benzo[h] chromene)

c3: 7'-Methoxyspiro(bicyclo[3.3.1]nonane-9,2'-[2H] benzo[h]chromene)

[Spirooxazine compound]

s1: 6'-Fluoro-1', 5'-dimethyl-6"-morpholinodispiro (cyclohexane-1, 3[3H]indole-2[2 H] 3[3H]naphtho 3,2a ][1, 4]oxazine)

(G) Ultraviolet stabilizers

LS-2626: Sanol LS-2626 (trade name, a product of Sankyo Co., Ltd.)

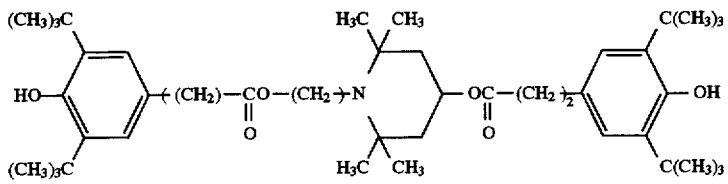

LA-63 A: LA-63 A (trade name, a product of Asahi Denka Kogyo K.K.); a condensation product between 1,2,3,4-utanetetracarboxylic acid, 1,2,2,6,6-pentamethyl-4-piperidinol and β, β, β', β'-tetramethyl-3,9-(2,4,8,10-tetraoxaspiro [5.5]undecane)diethanol HBP: HBP (trade name, a product of Johoku Chemical Co., Ltd.); hydrogenated bisphenol A phosphate polymer.

EXAMPLES 1–14 AND COMPARATIVE EXAMPLES 1–3

One part by weight of t-butyl peroxy- 2-ethylhexanoate as a radical polymerization initiator was added to each curable composition comprising components (A) to (F) and ultraviolet stabilizers as component (G), shown in Table 1, followed by sufficient mixing. The resulting mixture was poured into a mold constituted by a glass sheet and a gasket composed of an ethylene-vinyl acetate copolymer, and cast polymerization was conducted. In the polymerization, an air oven was used; temperature inside of the oven was elevated gradually over 18 hours from 30° C. to 90° C., and 90° C. was maintained for 2 hours. After the completion of polymerization, the mold was taken out of the air oven and allowed to cool. Then, a cured product was taken out of the glass mold.

Each photochromic cured product obtained above was measured for photochromic property, physical properties and yield in polymerization by the following methods, and the results are shown in Table 2.

(1) Developed color and density of developed color

Each photochromic cured product obtained above (thickness: 2 mm) was irradiated with a beam emitted from a xenon lamp [L-2480 (300 W) SHL-100, a product of Hamamatsu Photonics Co., Ltd] via Aero Mass Filter (a product of Corning Co., Ltd.) at 20°±1° C. with beam intensities of 2.4 mW/cm² (at 365 nm) and 24 μW/cm² (at 245 nm) on the surface of the cured product for 120 seconds, to give rise to color development. The developed color was examined visually. Also, [ε(120 sec.)−ε(0 sec.)) was determined and used as the density of developed color of the cured product. Incidentally, ε(120 sec.) is the absorbance of the photochromic cured product at its maximum absorption wavelength when the cured product was irradiated for 120 seconds under the above conditions to give rise to color development; and ε(0 sec.) is the absorbance of the photochromic cured product before irradiation at the same wavelength.

(2) Durability

Fatigue life was measured by the use of a xenon fadeometer (FAC-25AX-HC, a product of Suga Shikenki K.K.). Fatigue life was expressed by a time ($T_{1/2}$) required for the absorbance at the maximum absorption wavelength due to a photochromic compound, of a cured product reaching ½ of the initial ($T_o$) absorbance. Herein, the absorbances at $T_o$ and $T_{1/2}$ are each a value obtained by subtracting the absorbance of the cured product before irradiation at the maximum absorption wavelength.

(3) Light transmittance

Light transmittance was measured at 500 nm by the use of a spectrophotometer (220A, a product of Hitachi, Ltd.).

(4) Surface hardness

A L-scale value was measured on a cured product having a thickness of 2 mm, by the use of a Rockwell hardness tester.

(5) Saturation water absorption

A disc-shaped cured product having a thickness of 2 mm was immersed in a hot water of 50° C., and when the cured product had its saturation water absorption, the weight increase of the cured product was measured. The saturation water absorption of the cured product was calculated from the weight increase.

(6) Change in developed color density by water absorption, of cured product

The change in developed color density by water absorption, of a photochromic cured product was measured by the following method as the acceleration test under severe conditions which are simulated the long-term storage of the photochromic cured product. A cured product (thickness: 2 mm) right after completion of the polymerization was measured for developed color density (initial) according to the method (1) mentioned above. Then, the cured product was immersed in a hot water of 50° C. without exposing a light and, when reached at its saturation water absorption, it was measured for developed color density (after water absortion). The change (%) in developed color density was calculated using the following equation.

Change (%)=[developed color density (after water absorption)−developed color density (initial)]/[developed color density (initial)]*100

(7) Shrinkage after polymerization

Calculated from the specific gravity of a photochromic curable composition and the specific gravity of a cured product obtained from the composition.

(8) Yield in polymerization

There were prepared circular lenses of cured product having a diameter of 70 mm, a central thickness of 2 mm and a peripheral thickness of 10 mm. At this time, the yield was rated according to the following criterion.

○:All of the 10 cured products caused no polymerization releasing and had a good surface condition.

Δ: 5 to 9 of the 10 cured products caused no polymeruization releasing.

×: Less than 5 of the 10 cured products caused no polymerization releasing.

(9) Falling ball test

Steel balls each having a different weight were dropped on the center of each of 10 lenses each having a central thickness of 2 mm, from a height of 127 cm, to allow each lens to have damage or a crack(s). The weights of the steel balls which caused damage or a crack(s), were averaged on the 10 lenses.

TABLE 1

| No. | (A) Epoxy compound | (B) Polypropylene glycol di(meth)-acrylate | (C) Polyethylene glycol di(meth)-acrylate | (D) (Meth)-acrylate or styryl-based monomer | (E) α-Methyl-styrene dimer | (F) Photochromic compound | (G) Ultraviolet stabilizer |
|---|---|---|---|---|---|---|---|
| Ex. 1 | GMA:1 | 4PG:50 | 3G:49 | — | 1 | f2:0.12 | — |
| Ex. 2 | GMA:10 | 3PG:45 | 4G:45 | — | 1 | f2:0.12 | — |
| Ex. 3 | MGA:10 | 3PG:45 | 4G:45 | — | 1 | f2:0.12 | — |
| Ex. 4 | BPMGMA:10 | 3PG:45 | 4G:45 | — | 1 | f2:0.12 | — |
| Ex. 5 | EGGE:5 | 3PG:50 | 4G:45 | — | 1 | f2:0.12 | — |
| Ex. 6 | GMA:10 | 3PG:61 | 4G:25 | MS:4 | 1 | f2:0.12 | — |
| Ex. 7 | GMA:10 | 3PG:40 | 4G:40 | MS:10 | 1 | f2:0.12 | — |
| Ex. 8 | GMA:10 | 3PG:45 | 4G:40 | MMA:5 | 1 | f2:0.12 | — |
| Ex. 9 | GMA:10 | 3PG:45 | 4G:40 | BzMA:5 | 1 | f2:0.12 | — |
| Ex. 10 | GMA:10 | 4PG:63 | 3G:25 | HEMA:2 | 1 | f2:0.12 | — |
| Ex. 11 | GMA:10 | 3PG:45 | 4G:45 | — | 1 | f1:0.06 f3:0.06 c1:0.065 | LS-2626:0.1 LA-63A:0.2 HBP:0.5 |
| Ex. 12 | GMA:10 | 3PG:45 | 4G:45 | — | 1 | f2:0.06 f3:0.06 c2:0.06 c3:0.01 | LS-2626:0.1 LA-63A:0.2 HBP:0.5 |
| Ex. 13 | GMA:10 | 3PG:45 | 4G:45 | — | 1 | f3:0.12 c2:0.045 | LS-2626:0.1 LA-63A:0.2 HBP:0.5 |
| Ex. 14 | GMA:10 | 3PG:45 | 4G:45 | — | 1 | f3:0.13 c2:0.045 s1:0.03 | — |
| Comp. Ex. 1 | — | 4PG:50 | 3G:50 | — | 1 | f2:0.12 | — |
| Comp. Ex. 2 | GMA:10 | 3PG:90 | — | — | 1 | f2:0.12 | — |
| Comp. Ex. 3 | GMA:10 | — | 3G:45, 4G:45 | — | 1 | f2:0.12 | — |

Ex.: Example
Comp. Ex.: Comparative Example

TABLE 2

| No. | Developed color | Density of developed color | $T_{1/2}$ (hours) | Light transmittance (%) | Surface hardness | Saturation water absorption (%) | Change in developed color density by water absorption of cured material (%) | Shrinkage after polymerization (%) | Yield in polymerization | Falling ball test (g) |
|---|---|---|---|---|---|---|---|---|---|---|
| Ex. 1 | Red purple | 1.0 | 230 | 92 | 94 | 2.7 | 5 | 11 | ○ | 80 |
| Ex. 2 | Red purple | 1.0 | 255 | 92 | 94 | 2.9 | 5 | 11 | ○ | 81 |
| Ex. 3 | Red purple | 1.0 | 245 | 92 | 92 | 2.7 | 5 | 11 | ○ | 78 |
| Ex. 4 | Red purple | 1.0 | 260 | 92 | 92 | 2.6 | 5 | 11 | ○ | 85 |
| Ex. 5 | Red purple | 1.0 | 225 | 92 | 90 | 3.0 | 6 | 11 | ○ | 80 |
| Ex. 6 | Red purple | 1.0 | 230 | 92 | 97 | 2.1 | 3 | 11 | ○ | 60 |
| Ex. 7 | Red purple | 1.0 | 243 | 91 | 93 | 2.5 | 4 | 11 | ○ | 75 |
| Ex. 8 | Red purple | 0.9 | 270 | 92 | 95 | 2.6 | 4 | 11 | ○ | 77 |
| Ex. 9 | Red purple | 0.9 | 262 | 92 | 93 | 2.6 | 4 | 11 | ○ | 75 |
| Ex. 10 | Red purple | 1.0 | 258 | 92 | 90 | 2.1 | 4 | 11 | ○ | 74 |
| Ex. 11 | Brown | 0.8 | 253 | 92 | 94 | 2.9 | 5 | 11 | ○ | 82 |
| Ex. 12 | Brown | 0.8 | 250 | 92 | 94 | 2.9 | 5 | 11 | ○ | 78 |
| Ex. 13 | Gray | 0.8 | 248 | 92 | 94 | 2.9 | 5 | 11 | ○ | 80 |
| Ex. 14 | Gray | 0.8 | 300 | 91 | 94 | 2.9 | 5 | 11 | ○ | 80 |
| Comp. Ex. 1 | Red purple | 1.0 | 88 | 92 | 94 | 2.8 | 5 | 11 | △ | 77 |
| Comp. Ex. 2 | Red purple | 1.0 | 120 | 92 | 99 | 1.8 | 2 | 10 | ○ | 35 |
| Comp. Ex. 3 | Red purple | 1.0 | 250 | 92 | 95 | 4.5 | 13 | 13 | × | 70 |

Ex.: Example
Comp. Ex.: Comparative Example

We claim:
1. A photochromic curable composition comprising a polymerizable monomer composed of 0.1 to 30 parts by weight of (A) a compound having at least one epoxy group in the molecule, 30 to 70 parts by weight of (B) a polypropylene glycol di(meth)acrylate monomer represented by the following general formula (I):

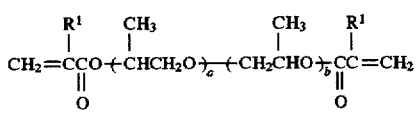

wherein $R^1$ is a hydrogen atom or a methyl group, and a and b are each independently a number of 0 to 7 with a proviso that (a+b)=2 to 7, 20 to 60 parts by weight of (C) apolyethylene glycol di(meth)acrylate monomer represented by the following general formula (II):

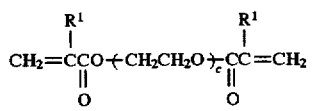

wherein $R^1$ is a hydrogen atom or a methyl group, and c is an integer of 2 to 9, and 0 to 35 parts by weight of (D) a (meth)acrylate monomer and/or a styryl monomer, the total of the components (A), (B), (C) and (D) being 100 parts by weight, and 0.1 to 2 parts by weight, based on 100 parts by weight of the polymerizable monomer, of (E) an α-methylstyrene dimer, and 0.001 to 10 parts by weight, based on 100 parts by weight of the polymerizable monomer, of (F) a photochromic compound.

2. A curable composition according to claim 1, wherein the compound having at least one epoxy group in the molecule is a compound represented by the following formula (III):

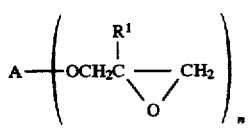

wherein A is a residue of an n-valent alcoholic hydroxyl group-containing compound, a residue of an n-valent phenolic hydroxyl group-containing compound, or an n-valent carboxylic acid residue; $R^1$ is a hydrogen atom or a methyl group; and n is an integer of 1 to 4.

3. A curable composition claim 1, wherein the compound having at least one epoxy group in the molecule is a compound represented by the following formula (IV):

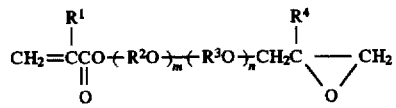

wherein $R^2$ and $R^4$ are each a hydrogen atom or a methyl group; $R^2$ and $R^3$ may be the same or different and are each an alkylene group having 1 to 4 carbon atoms which may be substituted with a hydroxyl group(s), or a group represented by the following formula

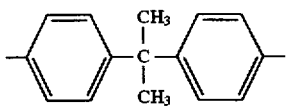

and m and n are each 0 or 1.

4. A curable composition according to claim 1, wherein the photochromic compound is a fulgide compound represented by the following general formula (V):

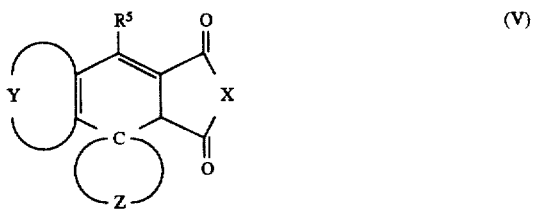

wherein the group represented by the following formula

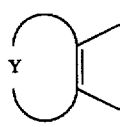

is a substituted or unsubstituted bivalent aromatic hydrocarbon group or a substituted or unsubstituted bivalent unsaturated heterocyclic group; $R^5$ is an alkyl group, an aryl group or a monovalent heterocyclic group; the group represented by the following formula:

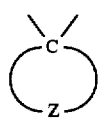

is a norbornylidene group or an adamantylidene group; and X is an oxygen atom, a group represented by >N—$R^6$, a group represented by >N- $A_1$ $B_1(A_2)_m(B_2)_n R^7$, a group represented by >N-$A_3$-$A_4$ or a group represented by >N-$A_3$-$R^8$ $R^6$ is a hydrogen atom, an alkyl group or an aryl group; $A_1$, $A_2$ and $A_3$ may be the same or different and are each an alkylene group, an alkylidene group, a cycloalkylene group or an alkylcycloalkan-diyl group; $B_1$ and $B_2$ may be the same or different and are each a group represented by the following group:

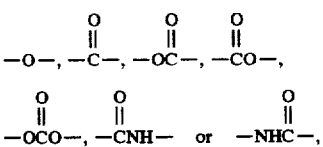

m and n are each independently 0 or 1 with a proviso that when m is 0, n is 0; $R^7$ is an alkyl group, a naphtyl group or a naphtylalkyl group; $A_4$ is a naphthyl group; and $R^8$ is a halogen atom, a cyano group or a nitro group.

5. A curable composition according to claim 1, wherein the photochromic compound is a chromene compound represented by the following formula (VI):

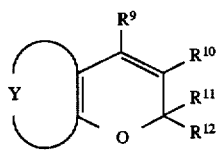

wherein $R^9$, $R^{10}$, $R^{11}$ and $R^{12}$ may be the same or different and are each a hydrogen atom, an alkyl group, an aryl group, a substituted amino group or a saturated heterocyclic group and $R^{11}$ and $R^{12}$ may form a ring together; and the group represented by the following formula:

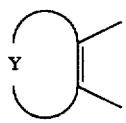

is a substituted or unsubstituted bivalent aromatic hydrocarbon group or a substituted or unsubstituted bivalent unsaturated heterocyclic group.

6. A curable composition according to claim 1, wherein the photochromic compound is a spirooxazine compound represented by the following formula (VII):

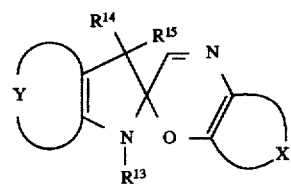

wherein $R^{13}$, $R^{14}$ and $R^{15}$ may be the same or different and are each an alkyl group, a cycloalkyl group, a cycloaralkyl group, an alkoxy group, an alkyleneoxyalkyl group, an alkoxycarbonyl group, an alkoxycarbonylalkyl group, an aryl group, an aralkyl group, an aryloxy group, an alkylenethioalkyl group, an acyl group, an acyloxy group or an amino group, $R^{14}$ and $R^{15}$ may together form a ring, and $R^{13}$, $R^{14}$ and $R^{15}$ may each have a substituent(s); and the groups represented by the following formula

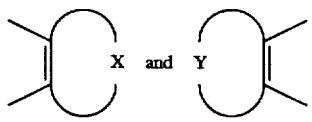

are each independently a substituted or unsubstituted bivalent aromatic hydrocarbon group or a substituted or unsubstituted bivalent unsaturated heterocyclic group.

7. A curable composition according to claim 1, wherein the photochromic compound is a combination of a fulgide compound represented by the formula (V)

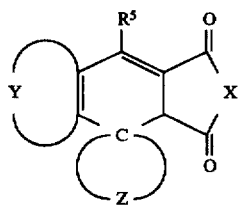

wherein the group represented by the following formula

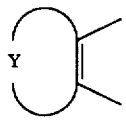

is a substituted or unsubstituted bivalent aromatic hydrocarbon group or a substituted or unsubstituted bivalent unsaturated heterocyclic group; $R^5$ is an alkyl group, an aryl group or a monovalent heterocyclic group; the group represented by the following formula:

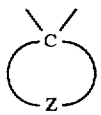

is a norbornylidene group or an adamantylidene group; and X is an oxygen atom, a group represented by $>N-R^6$, a group represented by $>N-A_1-B_1-(A_2)_m-(B_2)_n-R^7$, a group represented by $>N-A_3-A_4$ or a group represented by $>N-A_3-R^8$, $R^6$ is a hydrogen atom, an alkyl group or an aryl group; $A_1$, $A_2$ and $A_3$ may be the same or different and are each an alkylene group, an alkylidene group a cycloalkylene group or an alkylcycloalkan-diyl group; $B_1$ and $B_2$ may be the same or different and are each a group represented by the following group:

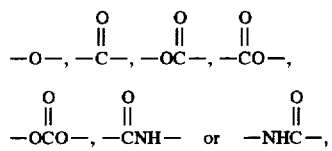

m and n are each independently 0 or 1 with a proviso that when m is 0, n is 0; $R^7$ is an alkyl group, a naphthyl group or a naphtylalkyl group; $A_4$ is a naphthyl group; and $R^8$ is a halogen atom, a cyano group or a nitro group, a chromene compound represented by the formula (VI)

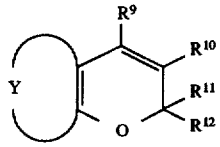

wherein $R^9$, $R^{10}$, $R^{11}$ and $R^{12}$ may be the same or different and are each a hydrogen atom, an alkyl group, an aryl group, a substituted amino group or a saturated heterocyclic group and $R^{11}$ and $R^{12}$ may form a ring together; and the group represented by the following formula:

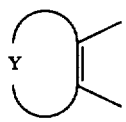

is a substituted or unsubstituted bivalent aromatic hydrocarbon group or a substituted or unsubstituted bivalent unsaturated heterocyclic group, and a spirooxazine compound represented by the formula (VII)

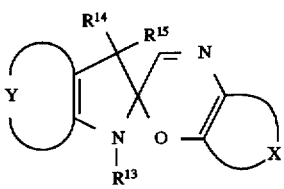
(VII)

wherein $R^{13}$, $R^{14}$ and $R^5$ may be the same or different and are each an alkyl group, a cycloalkyl group, a cycloaralkyl group, an alkoxy group, an alkyleneoxvalkyl group, an alkoxycarbonyl group, an alkoxycarbonylalkyl group, an aryl group, an aralkyl group, an aryloxy group, an alkylenethioalkyl group, an acyl group, an acyloxy group or an amino group, $R^{14}$ and $R^{15}$ may together form a ring, and $R^{13}$, $R^{14}$ and $R^{15}$ may each have a substituent(s); and the groups represented by the following formula

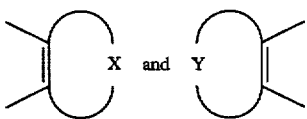

are each independently a substituted or unsubstituted bivalent aromatic hydrocarbon group or a substituted or unsubstituted bivalent unsaturated heterocyclic group.

8. A curable composition according to claim 1, wherein the compound having at least one epoxy group is selected from the group consisting of:

ethylene glycol glycidyl ether, propylene glycol glycidyl ether, glycerol polyglycidyl ether, diglycerol polyglycidyl ether, sorbitol polyglycidyl ether, butyl glycidyl ether, phenyl glycidyl ether, polyethylene glycol diglycidyl ether, polypropylene glycol diglycidyl ether, neopentyl glycol diglycidyl ether, 1,6-hexanediol diglycidyl ether, addition product of bisphenol A or hydrogenated bisphenol A with propylene oxide, diglycidyl terephthalate, spiroglycol diglycidyl ether and hydroquinone diglycidyl ether.

9. A curable composition according to claim 1, wherein the compound having at least one epoxy group is selected from the group consisting of:

glycidyl acrylate, glycidyl methacrylate, β-methylglycidyl acrylate, β-methylglycidyl methacrylate, bisphenol A-monoglycidyl ether methacrylate, 4-glycidyloxybutylmethacrylate, 3-(glycidyl-2-oxyethoxy)-2-hydroxypropyl methacrylate, 3-(glycidyloxy-1-isopropyloxy)-2-hydroxypropyl acrylate and 3-(glycidyloxy-2-hydroxypropyloxy)-2-hydroxypropyl acrylate.

10. A curable composition according to claim 1, wherein said polymerizable monomer is composed of 0.1 to 10 parts by weight of (A) per 100 parts by weight of the whole polymerizable monomer.

11. A curable composition according to claim 1, wherein the amount of component (B) is 40 to 65 parts by weight per 100 parts by weight of the whole polymerizable monomer.

12. A curable composition according to claim 1, wherein the proportion of component (C) is 25 to 50 parts by weight per 100 parts by weight of the whole polymerizable monomer.

13. A curable composition according to claim 1, wherein the photochromic compound (F) is present in an amount of 0.01 to 5 parts per weight per 100 parts per weight of the whole polymerizable monomer.

14. A lens comprising the photochromic curable composition of claim 1.

* * * * *